United States Patent
Bercich et al.

(10) Patent No.: US 11,989,327 B2
(45) Date of Patent: *May 21, 2024

(54) AUTOENCODER-BASED INFORMATION CONTENT PRESERVING DATA ANONYMIZATION SYSTEM

(71) Applicant: Lucinity ehf, Reykjavik (IS)

(72) Inventors: Justin Bercich, Reykjavik (IS); Theresa Bercich, Reykjavik (IS); Gudmundur Runar Kristjansson, Gardabaer (IS); Anush Vasudevan, Monroe Township, NJ (US)

(73) Assignee: Lucinity ehf, Reykjavik (IS)

( * ) Notice: Subject to any disclaimer, the term of this patent is extended or adjusted under 35 U.S.C. 154(b) by 104 days.

This patent is subject to a terminal disclaimer.

(21) Appl. No.: 17/545,819

(22) Filed: Dec. 8, 2021

(65) Prior Publication Data

US 2022/0100901 A1 Mar. 31, 2022

Related U.S. Application Data

(63) Continuation of application No. 17/020,453, filed on Sep. 14, 2020, now Pat. No. 11,227,067.

(Continued)

(51) Int. Cl.
*G06N 3/084* (2023.01)
*G06F 21/62* (2013.01)
(Continued)

(52) U.S. Cl.
CPC ......... *G06F 21/6254* (2013.01); *G06N 3/045* (2023.01); *G06N 3/048* (2023.01); *G06N 3/084* (2013.01)

(58) Field of Classification Search
None
See application file for complete search history.

(56) References Cited

U.S. PATENT DOCUMENTS 6,128,609 A 10/2000 Rose
10,282,658 B2 5/2019 Alvarez-Icaza Rivera et al.
(Continued)

OTHER PUBLICATIONS

Ma et al. "Fall detection using optical level anonymous image sensing system", OLT, 2019, pp. 44-61.*
(Continued)

*Primary Examiner* — Li Wu Chang
(74) *Attorney, Agent, or Firm* — Lewis Rice LLC

(57) ABSTRACT

A method of providing an auto-encoder for anonymizing data associated with a population of entities is disclosed. The method includes providing a computer system with a memory storing specific computer-executable instructions for a neural network. The neural network includes an input layer of nodes; three or more layers of nodes; and an output layer of nodes to provide an encoded output vector. The second layer of nodes has more nodes than the first and third layers of nodes. The method also includes identifying a plurality of characteristics associated with the entities and preparing a plurality of input vectors that include a characteristic. The characteristics appear in the input vector as transformed numeric information from human recognizable text. The method includes training the neural network during a plurality of training cycles comprising: processing an input vector with the neural network to provide an encoded output vector; determining an output vector reconstruction error by calculating a function of the encoded output vector and the input vector; back-propagating the output vector reconstruction error back through the neural network; and recalibrating a weight to minimize the output vector reconstruction error. Additional neural networks are also disclosed. The outputs of the additional neural networks may be combined. Encoded output vectors may be compared to identify a common characteristic between two or more entities or to (Continued)

identify two or more entities with the common characteristic. An auto-encoder system for anonymizing data is also disclosed.

23 Claims, 4 Drawing Sheets

Related U.S. Application Data

(60) Provisional application No. 62/902,505, filed on Sep. 19, 2019.

(51) Int. Cl.
  *G06N 3/045* (2023.01)
  *G06N 3/048* (2023.01)

(56) References Cited

U.S. PATENT DOCUMENTS

| | | |
|---|---|---|
| 10,572,800 B2 | 2/2020 | Wang et al. |
| 2018/0101765 A1 | 4/2018 | Chiang et al. |
| 2018/0293488 A1 | 10/2018 | Dang et al. |
| 2019/0012592 A1 | 1/2019 | Beser et al. |
| 2019/0385043 A1 | 12/2019 | Choudhary et al. |
| 2020/0371491 A1 | 11/2020 | Wong |
| 2021/0034707 A1 | 10/2021 | Podgomy et al. |

OTHER PUBLICATIONS

Abay et al. "Privacy preserving synthetic data release using deep learning", 2018, pp. 17, ttps://www.researchgate.net/publication/330460051.*

Youkawa, Tetsuya et al., "Delayed Weight Update for Faster Convergence in Data-Parallel Deep Learning," Nov. 26, 2018, 5 pages.

Prasad, N., et al., "Comparison of Back Propagation and Resilient Propagation Algorithm for Spam Classification," 2013 Fifth International Conference on Computational Intelligence, Modelling and Simulation, Seoul, Korea (South), 2013, pp. 29-34.

Mirjalili, et al., "Semi-Adversarial Networks: Convolutional Autoencoders for Imparting Privacy to Face Images," IC Biometrics, 2018, pp. 82-89.

Dutta et al., "A Unified Coded Deep Neural Network Training Strategy Based on Generalized PolyDot Codes for Matrix Multiplication," 2018, https://arxiv.org/pdf/1811.10751.pdf, p. 49.

Phan et al., "Differential Privacy Preservation for Deep Auto-Encoders: An Application of Human Behavior Prediction," AAAI, 2016, pp. 1309-1316.

Abadi, M., et al., "Deep Learning with Differential Privacy," CCS' 16, Oct. 24-28, 2016, Vienna, Austria, pp. 308-318.

Qin, Z., et al., "Making Deep Neural Networks Robust to Label Noise: Cross-Training With A Novel Loss Function," IEEE Access, Sep. 12, 2019, pp. 130893-130902, vol. 7.

Yu, X., et al., "How Does Disagreement Help Generalization Against Label Corruption?," Proceedings of the 36th International Conference on Machine Learning, Long Beach, California, 2019, 11 pages.

* cited by examiner

FIG. 1B

- Characteristics of entities
  - PII Data

- credit history
- criminal record
- criminal history
- drug use history
- medical history
- hospital record
- police report
- tracking history

- name
- age
- residential address
- business address
- address of a family relative
- address of a business associate
- educational history
- employment history

- data from social media
- bank account number
- plurality of banking information data
- banking location
- purchase history
- purchase location
- invoice
- transaction date
- financial history

FIG. 2

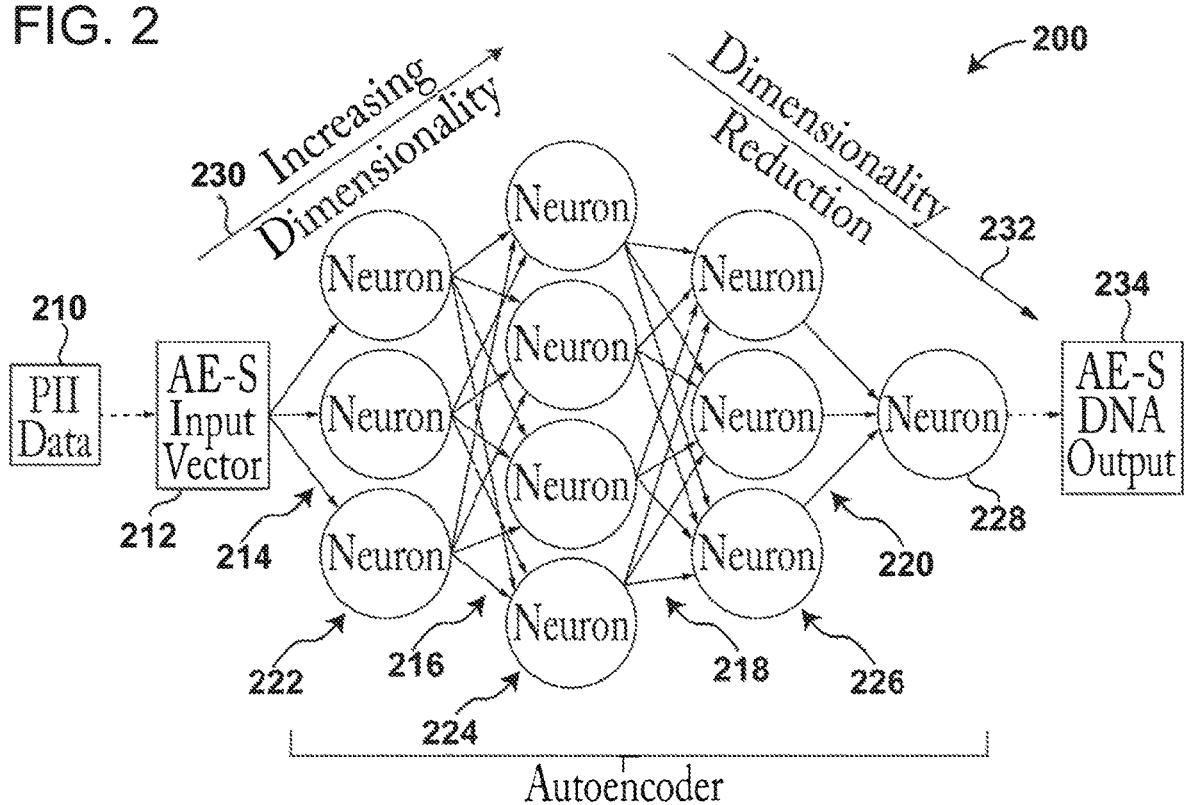

Autoencoder

AUTOENCODER-BASED INFORMATION CONTENT PRESERVING DATA ANONYMIZATION SYSTEM

CROSS REFERENCE TO RELATED APPLICATIONS

This application is a continuation of U.S. patent application Ser. No. 17/020,453, filed on Sep. 14, 2020, which claims the benefit of U.S. Provisional Application No. 62/902,505, filed on Sep. 19, 2019, the entirety of which are incorporated by reference herein.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

The invention relates to an autoencoder-based data anonymization method and apparatus for maintaining the integrity of entities and performing analysis after the anonymization method has been performed on the data. The invention may be used with machine-learning, data security, and in various domains that utilize sensitive information.

BACKGROUND OF THE INVENTION

In the past few years, there have been advancements in the capabilities of machine-learning, especially in the sub-discipline of neural networks and deep learning. Neural networks map input vector x to output y through complex mathematical operations optimized by a loss function. Neural networks can process vast amounts of data and detect patterns in a multidimensional manifold that are unrecognizable by humans. This achievement is a product of a multitude of calculations within a neural network and its large number of parameters that are defined during the model training, its architecture and hyper-parameter optimization process. This also means that, even if neural networks appear to be the exact same from an architectural and hyper-parameter perspective, their output can differ as during training the model self-optimizes each neuron's weight, thereby ever so slightly changing the mathematical combination of inputs.

For a wide field of domains, the analysis of personal identifiable information (PII) data, such as addresses, names and age or any other sensitive customer data, is an important and crucial task to be able to arrive at valuable insights. The conventional way of hashing, the most common way of encrypting data, does not suffice for the purposes of further elaborate and more complex analysis as the information content within the data is lost. One of the main attributes of hashing is that two similar inputs into a hashing algorithm provide whenever possible very different output hashes to maximize the security of the encrypted data. However, this means that slightly misspelled names, or zip codes that are nearly identical, produce very different hashes and it is mathematically near impossible to ascertain which data has a relational connection, be it geo-spatial proximity or detection of entities that are related. In order to analyze PII data, it is thus normally decrypted leaving it vulnerable.

Additionally, there may be reasons to encode other forms of data other than data typically considered to be PII. For example, there may be a need to encode financial, engineer, testing, or other data in order to ensure that the data itself is not easily digested by unauthorized sources. Regardless of the content of the data processes, conventional hashing functions may be less than ideal for the same reasons discussed immediately above. Further, the inventions disclosed herein may provide data that may be analyzed in such situations without access to the original data that has not been encoded.

BRIEF SUMMARY OF THE INVENTION

A method provides an auto-encoder for anonymizing data associated with a population of entities. The method includes providing a computer system with a memory storing specific computer-executable instructions for a neural network. The neural network includes input nodes; a first layer of nodes for receiving an output from the input nodes; a second layer of nodes positioned on an output side of the first layer of nodes; one or more additional layers of nodes positioned on an output side of the second layer of nodes; and output nodes for receiving an output from the last inner layer of nodes to provide an encoded output vector. An inner layer of nodes includes a number of nodes that is greater than a number of nodes in a layer of nodes on the input side of such inner layer and is also greater than a number of nodes in a layer of nodes on the output side of such layer. The method includes identifying a plurality of characteristics associated with at least a subset of the entities in the population and preparing a plurality of input vectors that include at least one of the characteristics, wherein the characteristics appear in the respective input vectors as numerical information transformed from human recognizable text. The method includes training the neural network with the plurality of input vectors. The training includes a plurality of training cycles wherein the training cycle comprises: inputting one of the input vectors at the input nodes; processing said input vector with the neural network to provide an encoded output vector at the output node; determining an output vector reconstruction error by calculating a function of the encoded output vector and the input vector; back-propagating the output vector reconstruction error back through the neural network from the output nodes back to the input nodes by a chained derivative of the outputs and weights of the intervening nodes; recalibrating a weight in one or more of the nodes in the neural network to minimize the output vector reconstruction error.

The method may include programming the computer system with a second neural network and with a third neural network and combining the encoded output vector of the neural network, the second neural network and the third neural network. Additional neural networks may also be used and their respective encoded output vectors may also be combined with the encoded output vectors of the neural network, the second neural network, and the third neural network. Such additional neural networks would be used so that there is one neural network for each of the data fields that have to be encrypted. And since there can be 50, 100, 200 or more data fields, an equal number of neural networks will be used within the scope of the invention. The method may also include preparing an input vector for the entities in the population and processing said input vector with the neural network to provide an encoded output vector at the output node for such entity. The method may include storing the encoded output vectors for subsequent use in identifying a common characteristic between two or more of the entities. The method may include comparing the encoded output vectors to identify the two or more entities with the common characteristic.

An auto-encoder system anonymizes data associated with a population of entities and includes a computer memory storing specific computer-executable instructions for a neural network. The neural network includes input nodes; a first layer of nodes for receiving an output from the input nodes; a second layer of nodes positioned on an output side of the first layer of nodes; one or more additional layers of nodes positioned on an output side of the second layer of nodes; and output nodes for receiving an output from the last inner layer of nodes to provide an encoded output vector. An inner layer of nodes includes a number of nodes that is greater than a number of nodes in a layer of nodes on the input side of such inner layer and is also greater than a number of nodes in a layer of nodes on the output side of such inner layer. The system further includes one or more processors in communication with the computer-readable memory. The one or more processors are programmed by the computer-executable instructions to at least obtain data identifying a plurality of characteristics associated with at least a subset of the entities in the population; prepare a plurality of input vectors that include at least one of the plurality of characteristics, wherein the characteristics appear in the respective input vectors as numerical information transformed from human recognizable text; and train the neural network with the plurality of input vectors. The training includes a plurality of training cycles wherein the training cycles comprise: inputting one of the input vectors at the input nodes; processing said input vector with the neural network to provide an encoded output vector at the output node; determining an output vector reconstruction error by calculating a function of the encoded output vector and the input vector; back-propagating the output vector reconstruction error back through the neural network from the output nodes back to the input nodes by a chained derivative of the outputs and weights of the intervening nodes; recalibrating a weight in one or more of the nodes in the neural network to minimize the output vector reconstruction error. In practice, it is contemplated that up to 10 processors, up to 50 processors, up to 100 processors, up to 500 processors, or even up to 1000 processors may be used. The preferred embodiments can be made scalable such that any number of processors may be used based on the number of entities and the number of characteristics to be encoded or tracked.

The autoencoder system may include a computer memory that stores specific computer-executable instructions for a second neural network and a third neural network. Additional neural networks may also be used and their respective encoded output vectors may also be combined with the encoded output vectors of the neural network, the second neural network, and the third neural network. Such neural networks include: an input node; a first layer of nodes for receiving an output from the input node; a second layer of nodes for receiving an output from the first layer of nodes; one or more additional layers of nodes for receiving an output from the second layer of nodes; and output nodes for receiving an output from the last inner layer of nodes to provide an encoded output vector. An inner layer of nodes includes a number of nodes that is greater than a number of nodes on the input side of such inner layer and is also greater than a number of nodes on the output side of such inner layer. The one or more processors are programmed by the computer-executable instructions to train the second and third neural networks with the plurality of input vectors. The training includes a plurality of training cycles wherein the training cycle comprise, for the respective second, third, and such additional neural networks: inputting one of the input vectors at the input node; processing said input vector with the respective neural network to provide an encoded output vector at the output node; determining an output vector reconstruction error by calculating a function of the encoded output vector and the input vector; back-propagating the output vector reconstruction error back through the respective neural network from the output nodes back to the input nodes by a chained derivative of the outputs and weights of the intervening nodes; recalibrating a weight in one or more of the nodes in the respective neural network to minimize the output vector reconstruction error. The one or more processors are programmed by the computer-executable instructions to combine the encoded output vector of the neural network, the second neural network and the third neural network to provide a combined encoded output vector.

The autoencoder system may include one or more processors that are programmed by the computer-executable instructions to prepare an input vector for the entities in the population; process said input vector with the neural network to provide an encoded output vector at the output node for the entities; and store the encoded output vectors for subsequent use in identifying a common characteristic between two or more of the entities. The autoencoder system may include one or more processors that are programmed by the computer-executable instructions to compare the encoded output vectors to identify the two or more entities with the common characteristic. In practice, it is contemplated that up to 10 processors, up to 50 processors, up to 100 processors, up to 500 processors, or even up to 1000 processors may be used. The preferred embodiments can be made scalable such that any number of processors may be used based on the number of entities and the number of characteristics to be encoded or tracked.

Other objects and features will be in part apparent and in part pointed out hereinafter.

BRIEF DESCRIPTION OF THE SEVERAL VIEWS OF THE DRAWING

FIG. 1B is an expansion of the memory 104 in FIG. 1A to show a non-exclusive list of the additional types of data that may be stored concerning characteristics of entities.

FIG. 2 shows a single autoencoder for anonymizing data that amalgamates all of the relevant PII data fields.

Corresponding reference characters indicate corresponding parts throughout the drawings.

DETAILED DESCRIPTION OF THE INVENTION

The present autoencoder system can maintain anonymity and preserve the relational content between and among PII and other data while still encoding it in a safe manner. Therefore, the data can still be used for network analysis, deduplication efforts and can generally serve as an input into machine-learning models to detect complex patterns whose accuracy and veracity is enhanced by the inclusion of this encoded PII or other data in the analysis. Prior hashing functions are unable to provide this functionality. Business and research areas alike should be able to utilize this encoded data for analysis, without having to have access to the original data. This is especially applicable in (but not restricted to) the financial sector for the purposes of fraud detection and anti-money laundering efforts, and in the healthcare sectors, allowing third party providers and researchers to work with a more complete dataset than ever before without revealing any actual PII or other data. Similarly, such encoding techniques and systems may be applicable in business or personal settings wherein the underlying data to be analyzed is unique, proprietary, difficult to obtain, or otherwise has some business value. By encoding such information, a complete dataset may be worked with and shared more securely than was previously possible. As used herein, the term "PII" may be broad enough to include such additional data.

Figure 1A:
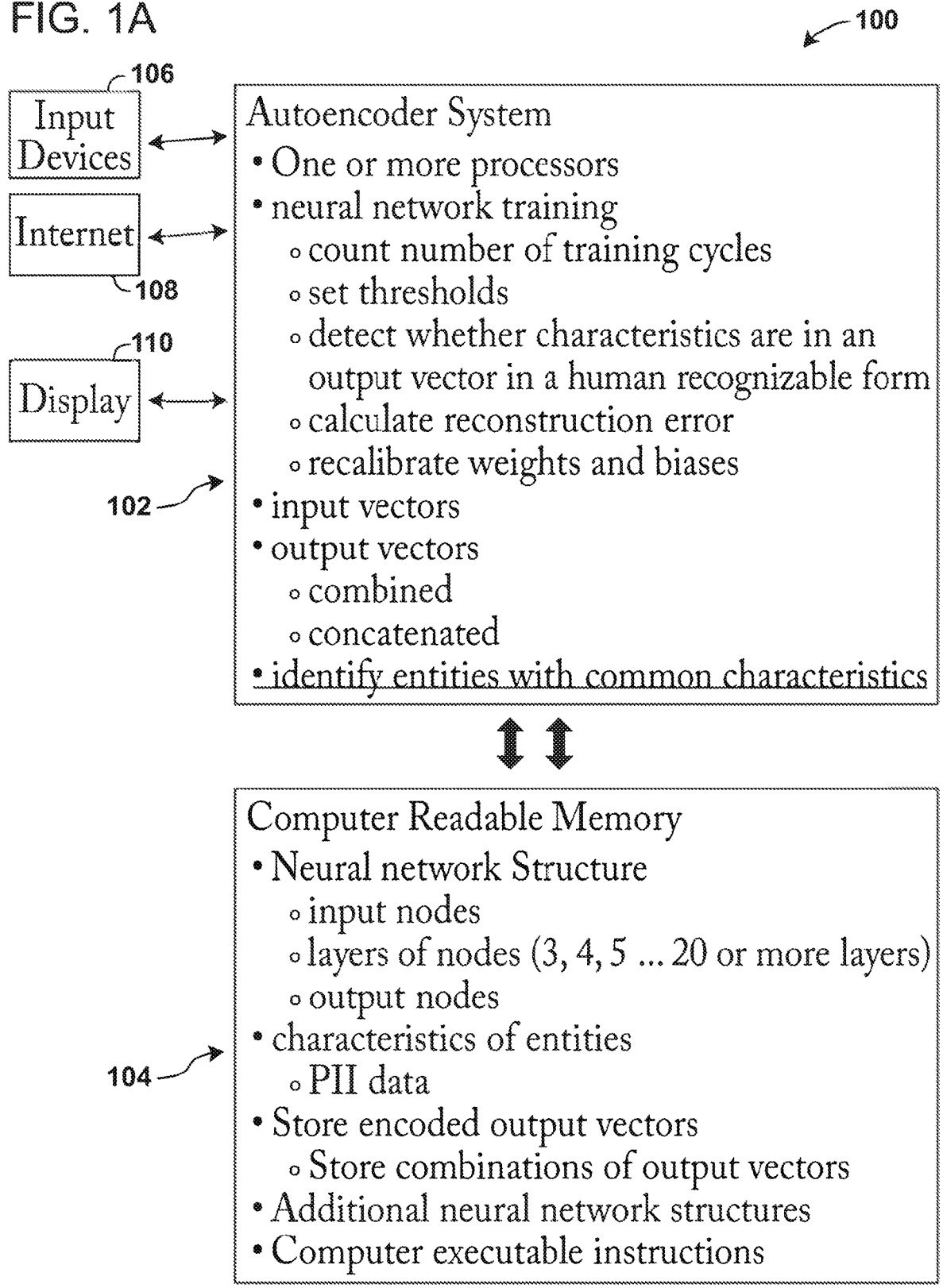
FIG. 1A shows a computer system for anonymizing data.

The autoencoder system, such as that generally shown in FIG. 1A, takes PII data as input, increases its dimensionality in a latent space, performs mathematical operations including a form of dimensionality reduction, and then arrives at an encoded output of data which can be used for further analysis. The novelty of this approach is two-fold: firstly, the usage of deep learning algorithms as a system for encryption; and secondly, the usability of PII data after being unidentifiably encoded while maintaining the relational position of the PII data to each other. The mathematical theory of pattern recognition and the near impossible exact replicability of a model are harnessed as main strengths in the autoencoder system to encode personal identifiable information (PII) for the purpose of further analysis.

Figure 3:
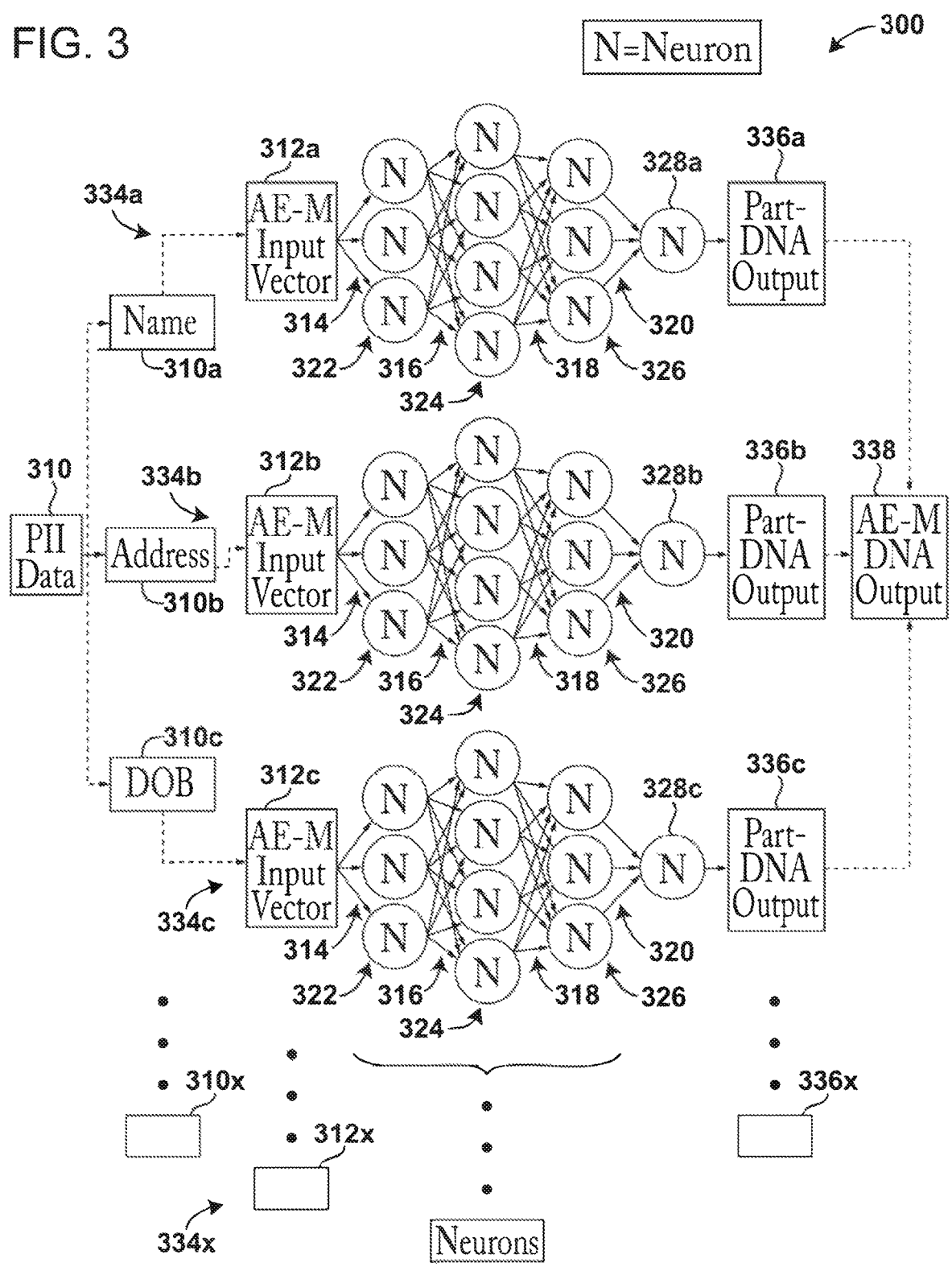
FIG. 3 shows multiple autoencoders for anonymizing data where the autoencoders are assigned and trained on a specific PII data field and their respective outputs are combined.

Two systems are devised to achieve this result for different applications. As seen in FIG. 2, the first system uses a 'single' autoencoder that amalgamates all relevant PII data fields and trains a unique autoencoder model with attached neuron weights. As seen in FIG. 3, the second system contains 'multiple' autoencoders, where each autoencoder is assigned and trained on a specific PII data field mapping each input to its own autoencoder, e.g. first names and last names have their own autoencoder to maximize security concerns as all parameters, hyper-parameters, architectural properties and the training dataset has to be present to be able to attempt the decryption of the output. Neither of these systems has previously been used to provide useful, anonymized data.

More particularly, FIG. 2 shows a graphic that depicts the PII data schematic 210 which indicates the directional flow of data through the Singular Autoencoder (AE-S) system 200. The PII Data 210 is transformed into a feature vector format and serves as an input into the input nodes AE-S 212. The autoencoder 200 is represented by its neurons and their connections. A neuron is a mathematical entity in which an activation function is applied to a calculated value to arrive at an interim transitional output value, which through a series of directional connections informs the mathematical transformations applied to the data as it flows through the AE-S system, analogous to a computational graph, visually from left to right.

The PII data 210, which is split into a feature vector, is fed into the autoencoder AE-S system as a single data vector at 212. The solid lines (214, 216, 218, 220) connect the input 212, through each of the layers of neurons (222, 224, 226) to the output layer 228 represent a complex mathematical transformation in which a myriad of combinatorial compositions of the input is analyzed. Output layer 228 has the same dimensionality as the input node 212. Concretely this means that we take the input feature vector $x_0$ and perform the following transformation on it, $n_1 = w_{i,0}^T x_0 + b_0$, where w is a matrix of trainable weights, b is a bias term vector, and i is the relevant neuron in the input layer, to compute the neuronal input of neuron $n_1$ in the adjacent layer. Further, within each neuron itself, an activation function is applied so that $z_1 = \varphi(n_1)$ where $\varphi$ represents the chosen activation function and $z_1$ is the neuronal output. The input into a neuron in the next layer would thus be $n_2 = z_1 w_{j,1} + \ldots + z_j w_{j,k} + b_{j,k}$, where j is the relevant neuron in the previous layer, k is the relevant neuronal connection in the current layer, $b_{j,k}$ is the relevant bias, and the weight subscripts indicate the neuronal layer and the relative position of the neuron, which amounts to $n_2 = w_{j,k}^T z + b_{j,k}$ in matrix format, which is activated in the new neuron again. This creates a deep abstraction from the original input data through chained equations.

An additional layer of abstraction is provided by the architecture of the autoencoder itself as the dimensionality of the data is significantly increased as shown by arrow 230 from "a" input neurons where b>a neurons in the deeper layers of the network. Dimensionality reduction as shown by arrow 232 thereafter occurs to transform the larger layers, e.g. layer 224, to an output layer 228 having the same dimensionality as the dimensionality of the input node 212. The output of the system provided at a schematic box 234 is a deep abstraction of the original PII input data 210 and thus is not replicable without the exact same autoencoder system 200 in place and, even then, replication is a very complex undertaking.

In a preferred embodiment, the autoencoders 200 in FIGS. 2 and 334a, 334b & 334c in FIG. 3 may preferably contain the same number of nodes in the first layer of nodes as in the third layer of nodes. In another preferred embodiment, the first, second and third layers of nodes in the autoencoders 200 in FIGS. 2 and 334a, 334b & 334c in FIG. 3 may contain three nodes, five nodes, up to 25 nodes, up to 50 nodes, or up to 500 nodes. In another preferred embodiment, the input node and the output node in the autoencoders 200 in FIGS. 2 and 334a, 334b & 334c in FIG. 3 may be single nodes. In another preferred embodiment, the input vector and the output vector of the autoencoders 200 in FIGS. 2 and 334a, 334b & 334c in FIG. 3 may have the same length. The features of these preferred embodiments may also be combined together.

However, the AE-S outputs provide a transformed representation of the original PII vector data 210, resulting in an output vector at 234 that has both pseudonymized the data, while also being trained to create a 'DNA' or representation of the data that is analyzable and comparable with other output vectors. This is achieved by the training process of the system (explained more fully in FIG. 4, below) before the output vectors at 234 are used for analysis. The aforementioned trainable weights vector w is optimized during a process of optimization called backpropagation during which the model is exposed to synthetic data to learn the optimal abstract representation of it, thereby preserving the inherent information content in the data.

Natural language processing distances are calculated from various base features to transform the PII data 210 into numerical data, which is provided as input into AE-S at node 212. Autoencoders aim to find deep abstractions of the data as originally input, while minimizing the reconstruction error, which describes the distortions and shifts of the underlying distributions of the recreated abstract data compared to the original input data. An output vector reconstruction error is determined by calculating a function of the encoded output vector and the input vector. The objective of minimizing the reconstruction error through backpropagation is attained by back-propagating the output vector reconstruction error back through the neural network from the output nodes back to the input nodes by a chained derivative of the outputs and weights of the intervening nodes. This results in the weights iteratively being recalibrated to minimize the reconstruction error in each training step. Generally speaking, these models undergo thousands, if not more, training steps to arrive at the optimal setting.

The graphic in FIG. 3 depicts the schematic of the PII data 310 flowing through the developed Multiple Autoencoder (AE-M) system 300. The PII data 310 is split into its respective parts (310a, 310b, 310c . . . 310x) and a natural language processing distance is calculated from various base features to turn the data into numerical values. The PII data categories are then used as an input vector into the first node (312a, 312b, 312c . . . 312x) of their own respective autoencoder (334a, 334b, 334c . . . 334x) to arrive at a partial output (336a, 336b, 336c . . . 336x). All of the partial outputs (336a, 336b, 336c . . . 336x) from every autoencoder are then mathematically combined to arrive at the final output 338. Concatenation is a preferred method of combining the encoded output vectors, although any other combination of the encoded output vectors is within the scope of the invention.

FIG. 1B is an expansion of the memory 104 in FIG. 1A to show a non-exclusive list in memory 104a of the additional types of data that may be stored in memories 104 and 104a concerning characteristics of entities.

In view of the above, it is seen that FIGS. 1A, 1B, 2 & 3 show an auto-encoder system 100 for anonymizing data associated with a population of entities. A computer memory 104 stores specific computer-executable instructions for a neural network, wherein the neural network comprises: input nodes; a first layer of nodes for receiving an output from the input nodes; a second layer of nodes for receiving an output from the first layer of nodes; one or more additional layers of nodes for receiving an output from the second layer of nodes; and output nodes for receiving an output from the last inner layer of nodes to provide an encoded output vector. An inner layer of nodes includes a number of nodes that is greater than a number of nodes in a layer of nodes on the input side of such inner layer and is also greater than a number of nodes in a layer of nodes on the output side of such inner layer. One or more processors 102 are in communication with the computer-readable memory 104 and are programmed by the computer-executable instructions to at least obtain data identifying a plurality of characteristics associated with at least a subset of the entities in the population and prepare a plurality of input vectors that include at least one of the plurality of characteristics, wherein the characteristics appear in the respective input vectors as numerical information transformed from a human recognizable text. The one or more processors 102 also train the neural network with the plurality of input vectors, wherein the training comprises a plurality of training cycles. In practice, it is contemplated that up to 10 processors 102, up to 50 processors 102, up to 100 processors 102, up to 500 processors 102, or even up to 1000 processors 102 may be used. The preferred embodiments can be made scalable such that any number of processors may be used based on the number of entities and the number of characteristics to be encoded or tracked. In practice, the neural network can have 7 inner layers of nodes, 11 inner layers of nodes, 21 inner layers of nodes, or even 51 inner layers of nodes—so long as the inner layers of nodes between the input nodes and a central layer of nodes provide increasing dimensionality and so long as the inner layers of nodes between such central layer of nodes and the output node provide decreasing dimensionality.

FIG. 1A also includes input devices 106 such as a keypad, mouse, touchscreen, graphic user interface and such other commonly known input devices to those of ordinary skill in the art. Input devices 106 as well as an internet connection 108 and a display 110 are provided for use in storing computer executable instructions in memory 104 and retrieving same, operating the processors in system 102, providing inputs needed to train the various neural networks disclosed herein, storing and retrieving data needed for such training in memory 104, storing and retrieving encoded data in memory 104, reviewing the results of the operation of the preferred embodiments, and such other uses as required for the functioning of the preferred embodiments.

Figure 4:
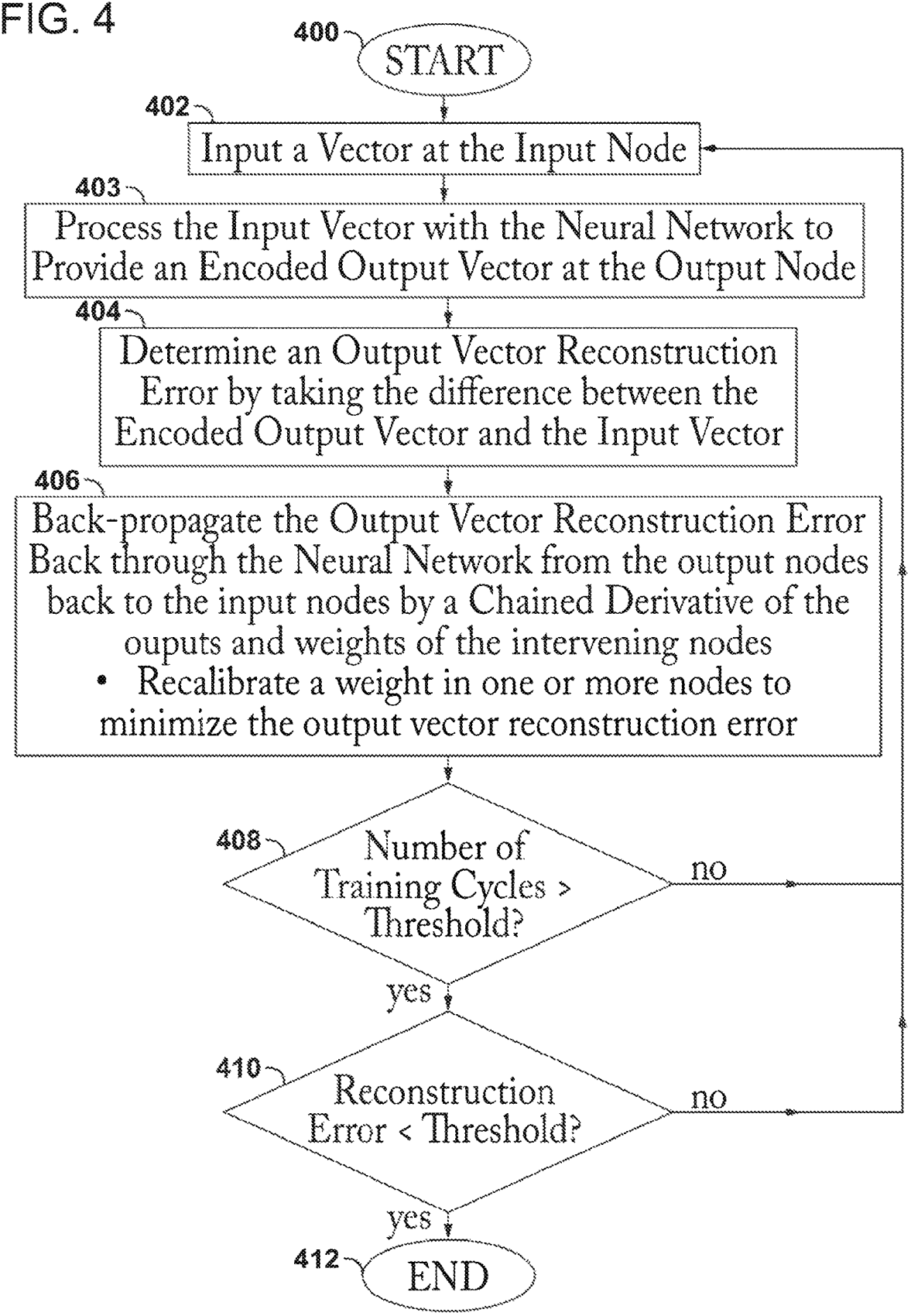
FIG. 4 shows a routine for training a neural network to anonymize data.

As seen in FIG. 4, a training cycle begins at the START 400. A training cycle comprises: the step 402 of inputting one of the input vectors at the input node; the step 403 of processing said input vector with the neural network to provide an encoded output vector at the output node; the step 404 of determining an output vector reconstruction error by calculating a function of the encoded output vector and the input vector; the step 406 of back-propagating the output vector reconstruction error back through the neural network from the output nodes back to the input nodes by a chained derivative of the outputs and weights of the intervening nodes; and recalibrating a weight in one or more of the nodes in the neural network to minimize the output vector reconstruction error.

The one or more processors 102 can also be programmed to set a threshold for a total number of training cycles and to stop the training of the neural network at step 408 in response to the number of training cycles exceeding the threshold. The one or more processors 102 can also be programmed to set a threshold as a function of a loss plane of the output vector reconstruction error and stop the training of the neural network at step 410 in response to the output vector reconstruction error being less than the threshold. The one or more processors can also be programmed to determine whether one of the characteristics in a plurality of selected input vectors is not also found in a human recognizable form in the respective encoded output vectors. This detection method may be based on use of additional input vectors having a same length as the additional encoded output vectors; and detecting that the output vector is not equal to the input vector or by detecting that more than 10%, 25%, or 50% of a plurality of values comprising the additional input vectors are different than a plurality of corresponding values in the respective additional encoded output vectors. Upon such detection, the one or more processors may fix the weights and biases in one or more of the nodes in the neural network.

In use after training, the one or more processors 102 may be programmed by the computer-executable instructions to fix the weights in one or more of the nodes in the neural network; and process a plurality of additional input vectors through the neural network to provide a plurality of respective additional encoded output vectors at the output node. A plurality of respective additional encoded output vectors will contain a plurality of characteristics, but said plurality of respective additional encoded output vectors will not contain said plurality of characteristics in a human recognizable form using any of the detection methods described above.

In use after training, the one or more processors 102 may be programmed by the computer-executable instructions to fix the weights in one or more of the nodes in the neural network; and process a plurality of additional input vectors through the neural network to provide a plurality of respective additional encoded output vectors at the output node. The majority of the respective additional encoded output vectors will contain a plurality of characteristics, but said majority of respective additional encoded output vectors will not contain said plurality of characteristics in a human recognizable form using any of the detection methods described above.

In use after training, the one or more processors 102 may be programmed by the computer-executable instructions to fix the weights in one or more of the nodes in the neural network; and process a plurality of additional input vectors through the neural network to provide a plurality of respective additional encoded output vectors at the output node. More than 90% of the respective additional encoded output vectors will contain a plurality of characteristics, but more than 90% of the respective additional encoded output vectors will not contain said plurality of characteristics in a human recognizable form using any of the detection methods described above.

The one or more processors 102 are also programmed to determine whether one of the plurality of characteristics in one of the input vectors is also found in a human recognizable form in the respective encoded output vector; and perform a plurality of additional training cycles in response to the respective encoded output vector containing said one of the plurality of characteristics in the human recognizable form using any of the detection methods described above.

The one or more processors 102 may be programmed to perform more than 100 training cycles, more than 1,000 training cycles, or more than 5,000 training cycles.

As seen in FIG. 1B, the plurality of characteristics may comprise data stored in the memory 104 which data is associated with any three or more of the following: a piece of personally identifiable information, a name, an age, a residential address, a business address, an address of a family relative, an address of a business associate, an educational history, an employment history, an address of any associate, a data from a social media site, a bank account number, a plurality of data providing banking information, a banking location, a purchase history, a purchase location, an invoice, a transaction date, a financial history, a credit history, a criminal record, a criminal history, a drug use history, a medical history, a hospital record, a police report, or a tracking history.

As also seen in FIG. 1A, the computer memory 104 may store specific computer-executable instructions for a second neural network and a third neural network, wherein the second and third neural networks each comprise: an input node; a first layer of nodes for receiving an output from the input node; a second layer of nodes for receiving an output from the first layer of nodes; a third layer of nodes for receiving an output from the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes. The one or more processors are also programmed by the computer-executable instructions to train the second and third neural networks with the plurality of input vectors, wherein the training comprises a plurality of training cycles wherein the training cycles comprise, for each of the respective second and third neural networks: inputting one of the input vectors at the input node; processing said input vector with the respective neural network to provide an encoded output vector at the output node; determining an output vector reconstruction error by calculating a function of the encoded output vector and the input vector; back-propagating the output vector reconstruction error back through the respective neural network from the output nodes back to the input nodes by a chained derivative of the outputs and weights of the intervening nodes; and recalibrating a weight in one or more of the nodes in the respective neural network to minimize the output vector reconstruction error. The one or more processors are programmed by the computer-executable instructions to combine the encoded output vector of the neural network, the second neural network and the third neural network to provide a combined encoded output vector. These three outputs may also be concatenated to provide a concatenated combined encoded output vector. Additional neural networks may also be used and their respective encoded output vectors may also be combined with the encoded output vectors of the neural network, the second neural network, and the third neural network. Such additional neural networks would be used so that there is one neural network for each of the data fields that have to be encrypted. And since there can be 50, 100, 200 or more data fields, an equal number of neural networks will be used within the scope of the invention.

The one or more processors 102 may also be programmed by the computer-executable instructions to prepare an input vector for the entities in the population; process said input vector with the neural network to provide an encoded output vector at the output node for each of the entities; and store the encoded output vectors in the memory 104 for subsequent use in identifying a common characteristic between two or more of the entities. The one or more processors 102 may also be programmed by the computer-executable instructions to compare the encoded output vectors to identify the two or more entities with the common characteristic.

An "entity" as used herein means a person, a company, a business, an organization, an institution, an establishment, a governing body, a corporation, a partnership, a unit of a government, a department, a team, a cooperative, or other group with whom it is possible to transact (e.g., to conduct business, or to communicate with, for example, on the internet or social media).

The data utilized in the methods of the invention include, but are not limited to, data regarding identity (e.g., height, weight, physical attributes, age, and/or sex); health-related data (e.g., blood pressure, pulse, genetic data, respiratory data, blood analysis, medical test results, personal disease history, and/or family disease history); personal data (e.g., relationship status, marital status, relatives, co-workers, place of work, previous workplaces, residence, neighbors, living address, previous living addresses, identity of household members, number of household members, usual modes of transportation, vehicles owned or leased, educational history, institutions of higher learning attended, degrees or certifications obtained, grades received, government or private grants, funding or support received, email addresses, criminal record, prior convictions, political contributions, and/or charitable contributions); personal information available from electronic devices used (e.g., phone records, text messages, voice messages, contact information, and app information); social media data (e.g., likes, comments, tags, mentions, photos, videos, ad interactions, and/or click information); credit data (e.g., household income, credit history and/or credit score); financial data (e.g., income sources, income amounts, assets, tax records, loan information, loan history, loan repayments, banking history, banking transactions, financial institutions involved in such transactions, transaction locations, mortgage information, mortgage history, account balances, number of accounts, counterparty information, fraud activity, and/or fraud alerts); and insurance information (e.g, insurance claims, insurance policies, and/or insurance payments received).

The methods of the invention are useful in analyzing data of entities in various sectors including, but not limited to, compliance for banks or other financial institutions, securities investigations, investigations of counterfeiting, illicit trade, or contraband, compliance regarding technology payments, regulatory investigations, healthcare, life sciences, pharmaceuticals, social networking, online or social media marketing, marketing analytics and agencies, urban planning, political campaigns, insurance analytics, real estate analytics, education, tax compliance and government analytics.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An auto-encoder system for anonymizing data associated with a population of entities, the system comprising:
a computer memory storing specific computer-executable instructions for a neural network, wherein the neural network comprises: an input node; a first layer of nodes for receiving an output from the input node; a second layer of nodes positioned downstream of the first layer of nodes; a third layer of nodes positioned downstream of the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes;

one or more processors in communication with the computer-readable memory, wherein the one or more processors are programmed by the computer-executable instructions to at least:
obtain data identifying a plurality of characteristics in a human readable text comprising one or more letters or numbers associated with at least a subset of the entities in the population;
prepare a plurality of input vectors that include more than one of the plurality of characteristics, wherein the characteristics appear in the respective input vectors in a human recognizable form; and
train the neural network with the plurality of input vectors, wherein the training comprises a plurality of training cycles wherein the training cycles comprise: inputting one of the input vectors at the input nodes; processing said input vector with the neural network to provide an encoded output vector at the output nodes; determining an output vector reconstruction error by calculating a function of the encoded output vector and the respective input vector; back-propagating the output vector reconstruction error back through the neural network from the output nodes back to the input nodes by a chained derivative of the outputs and weights of the intervening nodes; and recalibrating a weight in one or more of the nodes in the neural network to minimize the output vector reconstruction error;
wherein a plurality of the encoded output vectors during training include at least one of the plurality of characteristics recognizable for comparison by a processor to identify two or more encoded output vectors with a common characteristic but wherein said plurality of the encoded output vectors does not contain said at least one of the plurality of characteristics in a human recognizable form.

2. The system of claim 1 wherein the one or more processors are programmed by the computer-executable instructions to:
set a threshold as a function of a loss plane of the output vector reconstruction error; and
stop the training of the neural network in response to the output vector reconstruction error being less than the threshold.

3. The system of claim 1 wherein the one or more processors are programmed by the computer-executable instructions to:
determine whether one of the characteristics in a plurality of selected input vectors is also found in the respective encoded output vectors but not in a human recognizable form; and
fix the weights in one or more of the nodes in the neural network in response to the respective encoded output vector containing said characteristic but not in the human recognizable form.

4. The system of claim 1 wherein a plurality of the encoded output vectors during training include at least one of the plurality of characteristics but wherein said plurality of the encoded output vectors does not contain said at least one of the plurality of characteristics in a human recognizable form.

5. The system of claim 1 wherein the one or more processors are programmed by the computer-executable instructions to:
fix the weights in one or more of the nodes in the neural network; and process a plurality of additional input vectors through the neural network to provide a plurality of respective additional encoded output vectors at the output node;

wherein more than 10% of a plurality of values comprising the additional input vectors are different than a plurality of corresponding values in the respective additional encoded output vectors.

6. The system of claim 1 wherein the one or more processors are programmed by the computer-executable instructions to:

fix the weights in one or more of the nodes in the neural network; and process a plurality of additional input vectors through the neural network to provide a plurality of respective additional encoded output vectors at the output node;

wherein more than 25% of a plurality of values comprising the additional input vectors are different than a plurality of corresponding values in the respective additional encoded output vectors.

7. The system of claim 1 wherein the one or more processors are programmed by the computer-executable instructions to:

fix the weights in one or more of the nodes in the neural network; and process a plurality of additional input vectors through the neural network to provide a plurality of respective additional encoded output vectors at the output node;

wherein more than 50% of a plurality of values comprising the additional input vectors are different than a plurality of corresponding values in the respective additional encoded output vectors.

8. The system of claim 1 wherein the one or more processors are programmed by the computer-executable instructions to:

determine whether one of the plurality of characteristics in one of the input vectors is also found in a human recognizable form in the respective encoded output vector; and perform a plurality of additional training cycles in response to the respective encoded output vector containing said one of the plurality of characteristics in the human recognizable form.

9. The system of claim 1 wherein the one or more processors are programmed by the computer-executable instructions to perform more than 100 training cycles.

10. The system of claim 1 wherein the one or more processors are programmed by the computer-executable instructions to perform more than 1,000 training cycles.

11. The system of claim 1 wherein the one or more processors are programmed by the computer-executable instructions to perform more than 5,000 training cycles.

12. The system of claim 1 wherein the one or more processors are programmed by the computer-executable instructions to:

determine whether one of the plurality of characteristics in one of the input vectors is also found in a human recognizable form in the respective encoded output vector; and fix the weights in one or more of the nodes in the neural network in response to the respective encoded output vector not containing said one of the plurality of characteristics in the human recognizable form.

13. The system of claim 1 wherein the plurality of characteristics comprises data associated with any three or more of the following: a piece of personally identifiable information, a name, an age, a residential address, a business address, an address of a family relative, an address of a business associate, an educational history, an employment history, an address of any associate, a data from a social media site, a bank account number, a plurality of data providing banking information, a banking location, a purchase history, a purchase location, an invoice, a transaction date, a financial history, a credit history, a criminal record, a criminal history, a drug use history, a medical history, a hospital record, a police report, or a tracking history.

14. The system of claim 1 wherein the first layer of nodes in the neural network contains a same number of nodes as the third layer of nodes.

15. The system of claim 14 wherein the first and third layers of nodes in the neural network contain up to 25 nodes.

16. The system of claim 14 wherein the first and third layers of nodes in the neural network contain up to 50 nodes.

17. The system of claim 14 wherein the second layer of nodes in the neural network contains up to 500 nodes.

18. The system of claim 1 wherein the input node in the neural network is a single node and the output node in the neural network is a single node.

19. The system of claim 1 wherein the input vector has a length and wherein the encoded output vector has the same length.

20. An auto-encoder system for anonymizing data associated with a population of entities, the system comprising:

a computer memory storing specific computer-executable instructions for a neural network, wherein the neural network comprises: an input node; a first layer of nodes for receiving an output from the input node; a second layer of nodes positioned downstream of the first layer of nodes; a third layer of nodes positioned downstream of the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes;

one or more processors in communication with the computer-readable memory, wherein the one or more processors are programmed by the computer-executable instructions to at least:

obtain data identifying a plurality of characteristics associated with at least a subset of the entities in the population;

prepare a plurality of input vectors that include more than one of the plurality of characteristics, wherein the characteristics appear in the respective input vectors in a human recognizable form; and train the neural network with the plurality of input vectors, wherein the training comprises a plurality of training cycles wherein the training cycles comprise: inputting one of the input vectors at the input nodes; processing said input vector with the neural network to provide an encoded output vector at the output nodes; determining an output vector reconstruction error by calculating a function of the encoded output vector and the respective input vector; back-propagating the output vector reconstruction error back through the neural network from the output nodes back to the input nodes by a chained derivative of the outputs and weights of the intervening nodes; and recalibrating a weight in one or more of the nodes in the neural network to minimize the output vector reconstruction error;

wherein a plurality of the encoded output vectors during training include at least one of the plurality of characteristics but wherein said plurality of the encoded output vectors does not contain said at least one of the plurality of characteristics in a human recognizable form;

wherein the computer memory stores specific computer-executable instructions for a second neural network and a third neural network, wherein the second and third neural networks each comprise: an input node; a first layer of nodes for receiving an output from the input node; a second layer of nodes positioned downstream of the first layer of nodes; a third layer of nodes positioned downstream of the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes;

wherein the one or more processors are programmed by the computer-executable instructions to train the second and third neural networks with the plurality of input vectors, wherein the training comprises a plurality of training cycles wherein the training cycles comprise, for each of the respective second and third neural networks: inputting one of the input vectors at the input nodes; processing said input vector with the respective neural network to provide an encoded output vector at the output nodes; determining an output vector reconstruction error by calculating a function of the encoded output vector and the respective input vector; back-propagating the output vector reconstruction error back through the respective neural network from the output nodes back to the input nodes by a chained derivative of the outputs and weights of the intervening nodes; and recalibrating a weight in one or more of the nodes in the respective neural network to minimize the output vector reconstruction error; and wherein the one or more processors are programmed by the computer-executable instructions to combine the encoded output vector of the neural network, the second neural network and the third neural network to provide a combined encoded output vector.

21. An auto-encoder system for anonymizing data associated with a population of entities, the system comprising:

a computer memory storing specific computer-executable instructions for a neural network, wherein the neural network comprises: an input node; a first layer of nodes for receiving an output from the input node; a second layer of nodes positioned downstream of the first layer of nodes; a third layer of nodes positioned downstream of the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes;

one or more processors in communication with the computer-readable memory, wherein the one or more processors are programmed by the computer-executable instructions to at least:

obtain data identifying a plurality of characteristics associated with at least a subset of the entities in the population;

prepare a plurality of input vectors that include more than one of the plurality of characteristics, wherein the characteristics appear in the respective input vectors in a human recognizable form; and train the neural network with the plurality of input vectors, wherein the training comprises a plurality of training cycles wherein the training cycles comprise: inputting one of the input vectors at the input nodes; processing said input vector with the neural network to provide an encoded output vector at the output nodes; determining an output vector reconstruction error by calculating a function of the encoded output vector and the respective input vector; back-propagating the output vector reconstruction error back through the neural network from the output nodes back to the input nodes by a chained derivative of the outputs and weights of the intervening nodes; and recalibrating a weight in one or more of the nodes in the neural network to minimize the output vector reconstruction error;

wherein a plurality of the encoded output vectors during training include at least one of the plurality of characteristics but wherein said plurality of the encoded output vectors does not contain said at least one of the plurality of characteristics in a human recognizable form;

wherein the input vector has a length and wherein the encoded output vector has the same length; and wherein the one or more processors are programmed by the computer-executable instructions to concatenate the encoded output vector of the neural network, the second neural network and the third neural network to provide a concatenated combined encoded output vector.

22. The system of claim 1 wherein the one or more processors are programmed by the computer-executable instructions to:

prepare an input vector for the entities in the population;

process said input vector with the neural network to provide an encoded output vector at the output node for the entities; and store the encoded output vectors for subsequent use in identifying a common characteristic between two or more of the entities.

23. An auto-encoder system for anonymizing data associated with a population of entities, the system comprising:

a computer memory storing specific computer-executable instructions for a neural network, wherein the neural network comprises: an input node; a first layer of nodes for receiving an output from the input node; a second layer of nodes positioned downstream of the first layer of nodes; a third layer of nodes positioned downstream of the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes;

one or more processors in communication with the computer-readable memory, wherein the one or more processors are programmed by the computer-executable instructions to at least:

obtain data identifying a plurality of characteristics in a human readable text associated with at least a subset of the entities in the population;

prepare a plurality of input vectors that include more than one of the plurality of characteristics, wherein the characteristics appear in the respective input vectors in a human recognizable form; and train the neural network with the plurality of input vectors, wherein the training comprises a plurality of training cycles wherein the training cycles comprise: inputting one of the input vectors at the input nodes; processing said input vector with the neural network to provide an encoded output vector at the output nodes; determining an output vector reconstruction error by calculating a function of the encoded output vector and the respective input vector; back-propagating the output vector reconstruction error back through the neural network from the output nodes back to the input nodes by a chained derivative of the outputs and weights of the intervening nodes; and recalibrating a weight in one or more of the nodes in the neural network to minimize the output vector reconstruction error;

wherein a plurality of the encoded output vectors during training include at least one of the plurality of characteristics but wherein said plurality of the encoded output vectors does not contain said at least one of the plurality of characteristics in a human recognizable form;

wherein the one or more processors are programmed by the computer-executable instructions to:
  prepare an input vector for the entities in the population;
  process said input vector with the neural network to provide an encoded output vector at the output node for the entities;
  store the encoded output vectors for subsequent use in identifying a common characteristic between two or more of the entities; and
  compare the encoded output vectors to identify the two or more entities with the common characteristic.

\* \* \* \* \*